US012670686B2

(12) United States Patent
Zhao et al.

(10) Patent No.: US 12,670,686 B2
(45) Date of Patent: Jun. 30, 2026

(54) COMPUTING MINIMUM AREA BOUNDING SHAPES USING PARALLEL POINT SET ROTATIONS IN IMAGE PROCESSING SYSTEMS AND APPLICATIONS

(71) Applicant: NVIDIA Corporation, Santa Clara, CA (US)

(72) Inventors: Bin Zhao, NanYang (CN); Yue Zhu, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 376 days.

(21) Appl. No.: 18/334,743

(22) Filed: Jun. 14, 2023

(65) Prior Publication Data

US 2024/0395005 A1    Nov. 28, 2024

(30) Foreign Application Priority Data

May 25, 2023    (CN) ......................... 202310601229.X

(51) Int. Cl.
*G06V 10/20*        (2022.01)
*G06V 10/24*        (2022.01)

(52) U.S. Cl.
CPC .......... *G06V 10/255* (2022.01); *G06V 10/242* (2022.01)

(58) Field of Classification Search
CPC ........................... G06V 10/255; G06V 10/242
See application file for complete search history.

(56) References Cited

U.S. PATENT DOCUMENTS 6,243,097 B1 *   6/2001   Brokenshire et al. .. G06T 15/40
                                                               345/421

FOREIGN PATENT DOCUMENTS

WO       WO2023146228 A1 *   8/2023   ............. G06V 40/20

* cited by examiner

*Primary Examiner* — Vu Le
*Assistant Examiner* — Matthew James Bodnark
(74) *Attorney, Agent, or Firm* — IRON SUMMIT IP LLP

(57)                ABSTRACT

In various examples, determining point bounding shapes for systems and applications is described herein. Systems and methods are disclosed that determine a bounding shape (e.g., a minimum-area bounding rectangle) for an object and/or a point set associated with the object. In some examples, to determine the bounding shape, the systems and methods may rotate points from the point set to include various orientations. The systems and methods may then determine a respective bounding shape for one or more (e.g., each) orientation of the points and use the bounding shapes to determine a final bounding shape for the points. For example, the bounding shape that is associated with the smallest area may be selected for the points. The bounding shape may then be rotated by an angle in order to determine a final bounding shape for the object.

20 Claims, 13 Drawing Sheets

800

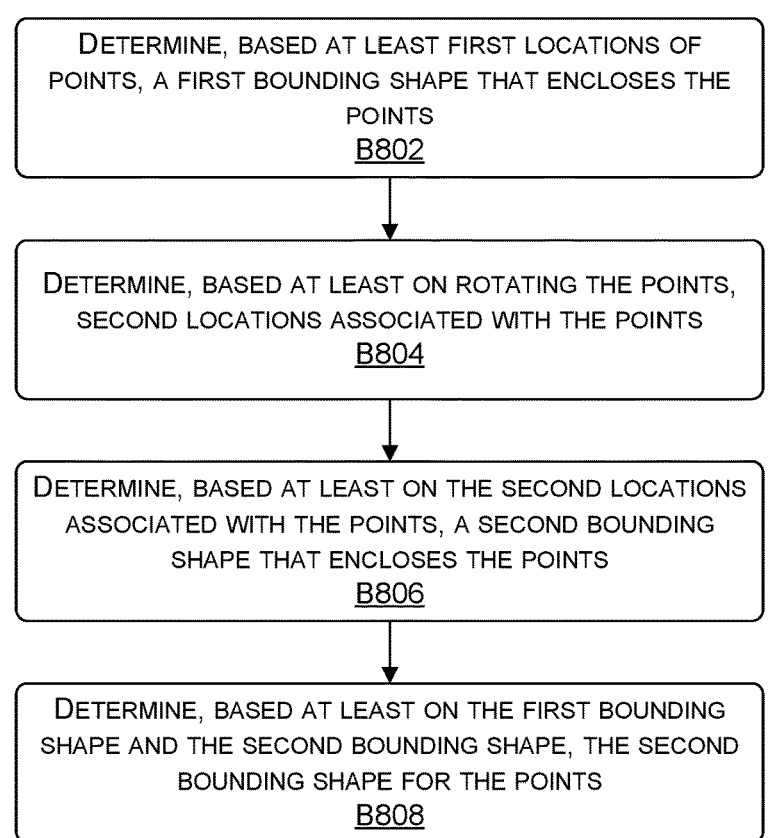

DETERMINE, BASED AT LEAST FIRST LOCATIONS OF
POINTS, A FIRST BOUNDING SHAPE THAT ENCLOSES THE
POINTS
B802

DETERMINE, BASED AT LEAST ON ROTATING THE POINTS,
SECOND LOCATIONS ASSOCIATED WITH THE POINTS
B804

DETERMINE, BASED AT LEAST ON THE SECOND LOCATIONS
ASSOCIATED WITH THE POINTS, A SECOND BOUNDING
SHAPE THAT ENCLOSES THE POINTS
B806

DETERMINE, BASED AT LEAST ON THE FIRST BOUNDING
SHAPE AND THE SECOND BOUNDING SHAPE, THE SECOND
BOUNDING SHAPE FOR THE POINTS
B808

COMPUTING MINIMUM AREA BOUNDING SHAPES USING PARALLEL POINT SET ROTATIONS IN IMAGE PROCESSING SYSTEMS AND APPLICATIONS

CROSS-REFERENCE TO RELATED APPLICATIONS

This application claims the benefit of Chinese Patent Application No. 202310601229.X, filed May 25, 2023 which is hereby incorporated by reference in its entirety.

BACKGROUND

In geometry, a minimum-area bounding rectangle is a two-dimensional (2D) bounding box that encloses an object and/or a set of points. For instance, and for an object depicted by an image, the object may be composed of a point set, where each point in the point set includes coordinates (e.g., a x-coordinate and a y-coordinate) indicating the location of the respective point in the image. As such, a system may process the locations of the points of the point set to determine a minimum-area bounding rectangle that encloses all of the points of the object. Additionally, since the minimum-area bounding rectangle is a representation of all of the points of the object in an image, the minimum-area bounding rectangle may be used as a representation of the location of the object within the image, which can be useful for further processing. For example, the system may further process the area of the image associated with the minimum-area bounding rectangle when performing object recognition, optical character recognition, and/or so forth.

In general, conventional systems that identify the minimum-area bounding rectangle initially compute a convex hull of a point set, where the convex hull is a polygon enveloping all of the points from the point set. The conventional systems may then iterate over edges of the convex hull, compute the smallest bounding rectangle which has an edge coincident with the convex hull edge, and then for all rectangles, select the rectangle with the minimum area. When performing such processes, the conventional systems may use various types of algorithms. For example, the conventional systems may use a first algorithm (e.g., the Sklansky algorithm) to compute the convex hull and a second algorithm (e.g., the Rotating Calipers algorithm) to calculate the bounding rectangle set of the convex hull. However, using different algorithms to perform these processes is not easy to implement programmatically. Additionally, these conventional systems are only able to process a single object at a time, which increases the latency of these conventional systems when processing multiple objects.

SUMMARY

Embodiments of the present disclosure relate to determining point set bounding shapes for systems and applications. Systems and methods are disclosed that determine a bounding shape (e.g., a minimum-area bounding rectangle) for an object and/or a point set associated with the object. In some examples, to determine the bounding shape, the systems and methods may rotate points from the point set to include various orientations. The systems and methods may then determine a respective bounding shape for one or more (e.g., each) orientation of the points and use the bounding shapes to determine a final bounding shape for the points. For example, the bounding shape that is associated with the smallest area may be selected for the points. The selected bounding shape may then be rotated by an angle in order to determine the final bounding shape for the object.

In contrast to conventional systems, such as those described above, the current systems, in some embodiments, are able to determine the final bounding shape for an object and/or point set using less processing steps. For instance, rather than using a first algorithm to determine a convex hull for points and then using a second algorithm to iterate over the edges of the convex hull to compute rectangles that include edges coincident with edges of the convex hull, the current systems may determine bounding shapes for different orientations of the points without initially determining a convex hull for the points. This may be easier for systems to implement and/or require less algorithms when determining a minimum-area bounding shape. Additionally, since the conventional systems perform the iterations sequentially, the latency associated with the conventional systems may increase. However, in contrast, the current systems may be able to determine the orientations of the points and/or the bounding shapes in parallel, which may reduce the overall latency.

Additionally, in contrast to the conventional systems, the current systems are able to more quickly determine bounding shapes for multiple objects. For instance, and as described above, the conventional systems may only be able to determine the bounding boxes for point sets sequentially, which increases the latency as the number of objects also increases. In contrast, and as will be described in more detail here, the current systems, in some embodiments, are able to determine the bounding shapes associated with multiple point sets in parallel, which reduces the latency of the current systems.

BRIEF DESCRIPTION OF THE DRAWINGS

The present systems and methods for determining point set bounding shapes for systems and methods are described in detail below with reference to the attached drawing figures, wherein:

FIG. 8 is a flow diagram showing a method for determining a bounding shape associated with a point set and/or an object, in accordance with some embodiments of the present disclosure;

DETAILED DESCRIPTION

Figure 1:
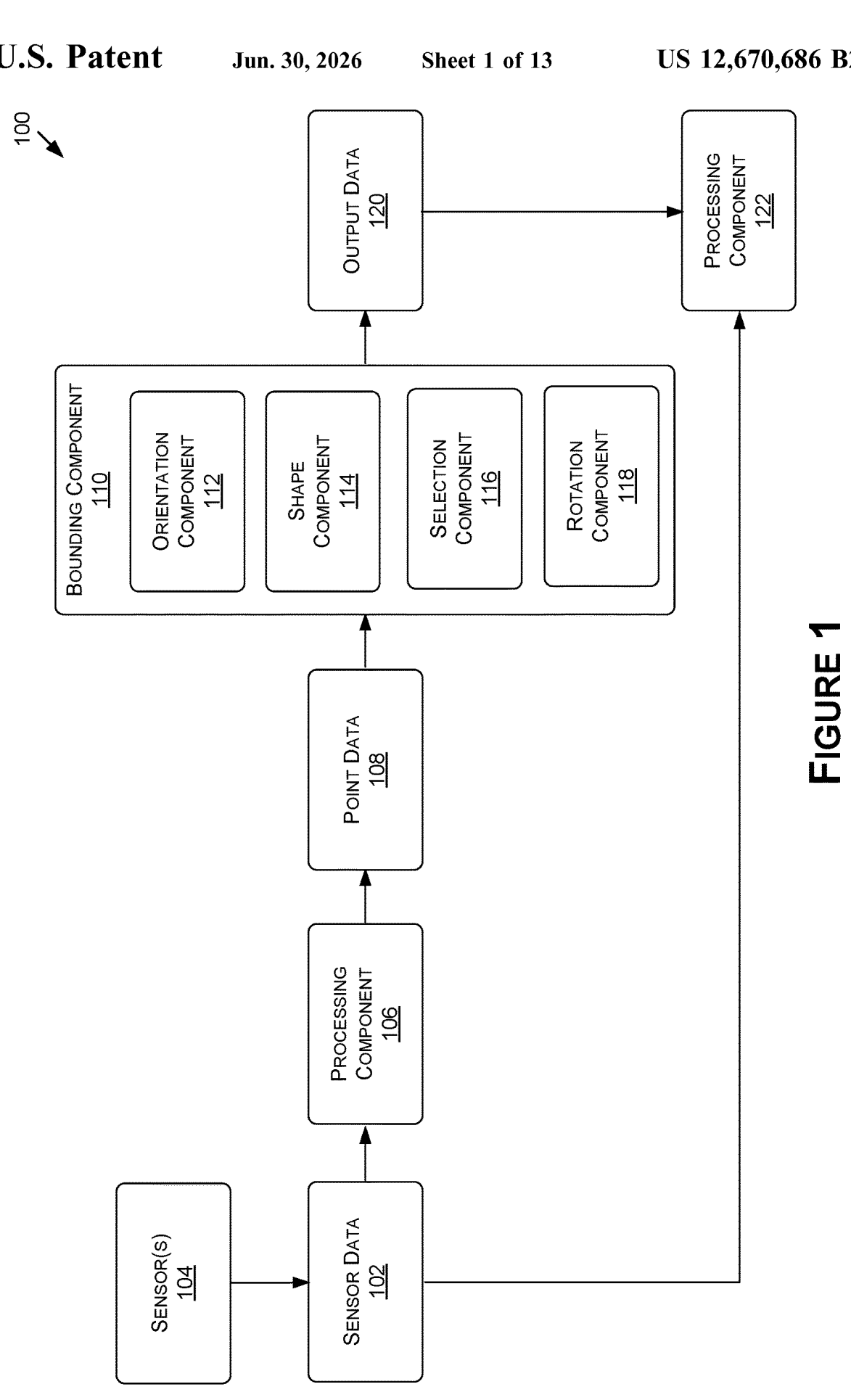
FIG. 1 illustrates an example data flow diagram for a process of determining bounding shapes associated with objects and/or point sets, in accordance with some embodiments of the present disclosure.

Systems and methods are disclosed related to determining point set bounding shapes for systems and applications. For instance, a system(s) may receive, generate, and/or obtain data representing a point set. As described herein, the point set may include points, where one or more points (e.g., each of the points) is associated with location information. For a first example, the location information for a respective point may indicate a two-dimensional (2D) location, such as a x-coordinate and a y-coordinate of the point. For a second example, the location information for a respective point may indicate a three-dimensional (3D) location, such as a x-coordinate, a y-coordinate, and a z-coordinate of the point. While these are just a couple examples of location information that may be associated with the points, in other examples, the points may be associated with any other type of location information.

In some examples, the system(s) generates the data representing the point set based at least on processing sensor data generated using one or more sensors. As described herein, the sensor data may include, but is not limited to, image data generated using an image sensor(s) (e.g., a camera(s)), LiDAR data generated using a LiDAR sensor(s), radar data generated using a radar sensor(s), and/or any other type of sensor data. For an example of generating the data representing the points set, the sensor data may include image data representing an image depicting at least two different objects. As such, the system(s) may process the image data and, based at least on the processing, determine at least a first point set (e.g., first feature points) associated with the first object and a second point set (e.g., second feature points) associated with the second object. For instance, the first point set may include first points that are located at various locations (e.g., pixels) of the image that depict the first object and the second point set may include second points that are located at various locations (e.g., pixels) of the image that depict the second object.

The system(s) may then determine bounding shapes that include (e.g., encompass, enclose, etc.) the point sets. For instance, and for a point set that includes points, the s ystem(s) may determine a first bounding shape that includes the points in a first orientation (e.g., an initial orientation before rotation). In some examples, to determine the first bounding shape, the system(s) may analyze first locations (e.g., first coordinates) associated with the points and determine at least a minimum value (e.g., coordinate value) associated with the first locations in a first direction (e.g., the x-coordinate direction), a maximum value associated with the first locations in the first direction, a minimum value associated with the first locations in a second direction (e.g., the y-coordinate direction), and a maximum value associated with the first locations in the second direction.

The system(s) may then use the minimum and maximum values to determine a first set of vertices for the first bounding shape. For example, a first vertex of the first set of vertices may be located at a location that is associated with the minimum values, a second vertex of the first set of vertices may be located at a location that is associated with the minimum value in the first direction and the maximum value in the second direction, a third vertex of the first set of vertices may be located at a location that is associated with the maximum values, and a fourth vertex of the first set of vertices may be located at a location that is associated with the maximum value in the first direction and the minimum value in the second direction. The system(s) may then determine the first bounding shape as including a bounding box that connects the first set of vertices. While this is just one example technique of how the system(s) may determine the first bounding shape, in other examples, the system(s) may use additional and/or alternative techniques to determine the first bounding shape.

The system(s) may then determine a second bounding shape that includes the points in a second orientation. For instance, the system(s) may rotate the first locations of the points by an angle in order to determine second locations associated with the points. As described herein, an angle of rotation may include, but is not limited to, 25 degrees, 50 degrees, 1 degree, 2 degrees, 5 degrees, and/or any other angle. The system(s) may then use the second locations associated with the points to determine a second bounding shape that includes the points at the second orientation. For example, the system(s) may analyze second locations (e.g., coordinates) associated with the points and determine at least a minimum value (e.g., coordinate value) associated with the second locations in the first direction (e.g., the x-coordinate direction), a maximum value associated with the second locations in the first direction, a minimum value associated with the second locations in the second direction (e.g., the y-coordinate direction), and a maximum value associated with the second locations in the second direction.

The system(s) may then use the minimum and maximum values to determine a second set of vertices for the second bounding shape. For example, a first vertex of the second set of vertices may be located at a location that is associated with the minimum values, a second vertex of the second set of vertices may be located at a location that is associated with the minimum value in the first direction and the maximum value in the second direction, a third vertex of the second set of vertices may be located at a location that is associated with the maximum values, and a fourth vertex of the second set of vertices may be located at a location that is associated with the maximum value in the first direction and the minimum value in the second direction. The system(s) may then determine the second bounding shape as including a bounding box that connects the second set of vertices. While this is just one example technique of how the system(s) may determine the second bounding shape, in other examples, the system(s) may use additional and/or alternative techniques for determining the second bounding shape.

The system(s) may then continue to perform these processes of rotating the points to different orientations and determining bounding shapes associated with the points in the different orientations. For example, the system(s) may continue to rotate the locations of the points using one or more angles until the points are rotated by a threshold angle. As described herein, the threshold angle may include, but is not limited to, 90 degrees 180 degrees, 270 degrees, 360 degrees, and/or any other angle. In some examples, the system(s) may rotate the locations of the points by the same angle with each rotation. However, in other examples, the system(s) may rotate the locations of the points by varying angles at each rotation. In either of the examples, the system(s) may perform the processes described herein (e.g., using the minimum and maximum values) to determine the bounding shapes for the various orientations of the points.

The system(s) may then select one of the bounding shapes for the points. In some examples, to select a bounding shape, the system(s) may determine (e.g., compute) areas associated with the bounding shapes and then select the bounding shape that is associated with the smallest area (e.g., the smallest bounding shape). The system may then determine a final bounding shape for the points by rotating the selected bounding shape by an angle. In some examples, the angle used to rotate the selected bounding shape is similar to the angle that was used to generate the orientation of the points that is associated with the selected bounding shape. For example, if the system(s) rotated the locations of the points clockwise by 45 degrees in order to determine the selected bounding shape, then the system(s) may rotate the selected bounding shape counterclockwise by 45 degrees in order to determine the final bounding shape.

The system(s) may then output data representing at least location information for the final bounding shape associated with the point set and/or the object associated with the point set. For instance, in some examples, the output data may indicate locations of the vertices of the bounding shape. In some examples, the output data may indicate a location of the center of the bounding shape along with a size (e.g., a length, width, etc.) associated with the bounding shape. Still, in some examples, the output data may indicate a location of one of the vertices of the bounding shape along with the size of the bounding shape. While these are just a couple examples of location information that may be output for the bounding shape, in other examples, the system(s) may output any other type of location information that indicates the location of the bounding shape.

In some examples, the system(s) (and/or another system(s)) may then perform additional processing based on the location of the bounding shape. For a first example, if the bounding shape indicates the location of an object within an image, the system(s) may then process the portion of the image associated with the bounding shape in order to determine semantic information (e.g., a class type, a segmentation mask, etc.) associated with the object. For a second example, if the bounding shape indicates the location of text within an image, then the system(s) may process the portion of the image associated with the bounding shape to identify the text. Still, for a third example, the system(s) may generate a cropped image using the bounding shape (e.g., an image that mostly depicts the object, text, points, etc.). While these are just a couple examples of processing that may be performed using the bounding shape, in other examples, the system(s) may perform additional and/or alternative processing using the bounding shape.

In some examples, the system(s) is able to perform one or more of these processes in parallel in order to reduce the overall latency of the system(s). For example, the system(s) may, at least partially in parallel, (1) determine the orientations of the points by performing the rotation and (2) determine of the bounding shapes associated with the orientations. Additionally, in some examples, the system(s) is able to perform one or more of these processes in parallel to determine bounding shapes for multiple objects. For example, and in the example above where the image data represents an image that depicts two objects, the system(s) may perform these processes to determine a first final bounding shape associated with the first object depicted by the image during a period of time. Additionally, during at least a portion of the period of time, the system(s) may perform these processes to determine a second final bounding shape associated with the second object depicted by the image. In some examples, the system(s) may perform such processes in parallel for any number of objects represented by any number of instances of sensor data (e.g., any number of images).

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, optical character recognition, data center processing, conversational AI, AI using language models, synthetic data generation, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems for implementing optical character recognition, systems implemented using an edge device, systems incorporating one or more virtual machines (VMs), systems for performing synthetic data generation operations, systems implemented at least partially in a data center, systems for performing conversational AI operations, systems for performing operations using language models, systems for performing light transport simulation, systems for performing collaborative content creation for 3D assets, systems implemented at least partially using cloud computing resources, and/or other types of systems.

FIG. 1 illustrates an example data flow diagram for a process 100 of determining bounding shapes associated with objects and/or point sets, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include receiving sensor data 102 generated using one or more sensors 104. As described herein, the sensor data 102 generated using the sensor(s) 104 may include, but is not limited to, image data generated using an image sensor(s) (e.g., a camera(s)), LiDAR data generated using a LiDAR sensor(s), radar data generated using a radar sensor(s), and/or any other type of sensor data generated using any type of sensor. In some examples, the sensor(s) 104 may be located on one or more machines. For a first example, the sensor(s) 104 may be located on a vehicle, such as an autonomous and/or semi-autonomous vehicle. For a second example, the sensor(s) 104 may be located on a machine that performs optical character recognition. While these are just a couple examples of machines that the sensor(s) 104 may be located on, in other examples, the sensor(s) 104 may be located on any other type of machine and/or at any other type of location.

The process 100 may include a processing component 106 that is configured to process the sensor data 102 and, based at least on the processing, output point data 108 representing one or more sets of points. For example, the processing component 106 may process the sensor data 102 using one or more techniques in order to determine feature points. The technique(s) may include, but is not limited to, Harris Corner, Scale Invariant Feature Transform (SIFT), Speeded Up Robust Feature (SURF), Features from Accelerated Segment Test (FAST), Oriented FAST and Rotated BRIEF (ORB), and/or any other technique. The processing component 106 may further process the sensor data to identify point sets that are associated with various objects represented by the sensor data 102. For example, if the sensor data 102 represents three objects, then the processing component 106 may determine that a first point set is associated with a first object, a second point set is associated with a second object, and a third point set is associated with a third object.

The point data 108 may represent the set(s) of points as well as information associated with the points included in the set(s) of points. For instance, and as described herein, a set of points may include points, where one or more points (e.g., each of the points) is associated with location information. For a first example, the location information for a respective point may indicate a 2D location, such as a x-coordinate and a y-coordinate of the point. For a second example, the location information for a respective point may indicate a 3D location, such as a x-coordinate, a y-coordinate, and a z-coordinate of the point. While these are just a couple examples of location information that may be associated with the points, in other examples, the points may be associated with any additional and/or alternative types of location information.

Figure 2:
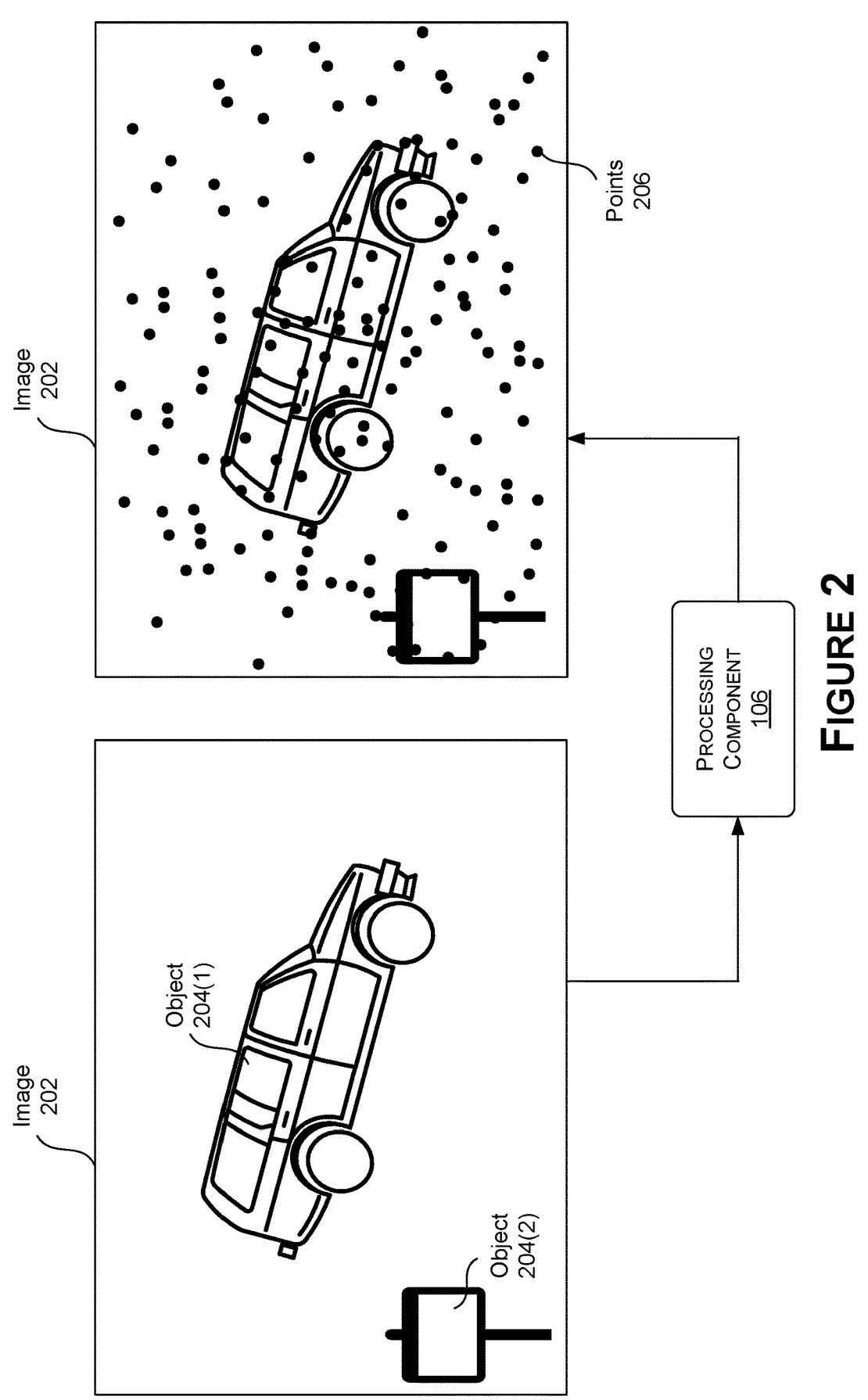
FIG. 2 illustrates an example of determining points associated with an image, in accordance with some embodiments of the present disclosure.

For instance, FIG. 2 illustrates an example of determining one or more sets of points associated with an image, in accordance with some embodiments of the present disclosure. As shown, the processing component 106 may process sensor data (e.g., image data) representing an image 202 that depicts at least a first object 204(1) and a second object 204(2). While the example of FIG. 2, illustrates the first object 204(1) as including a vehicle and the second object 204(2) as including a sign, in other examples, the first object 204(1) and/or the second object 204(2) may include any other type of objects (e.g., a pedestrian, text, a shape, an animal, a structure, etc.). Based at least on the processing, the processing component 106 may identify points 206 (e.g., feature points) (although only one is labeled for clarity reasons) associated with the image 202. While the example of FIG. 2 illustrates the processing component 106 is identifying one hundred and fifty-five points 206, in other examples, the processing component 106 may identify any number of points 206 (e.g., one point, ten points, one hundred points, one thousand points, etc.).

Figure 3:
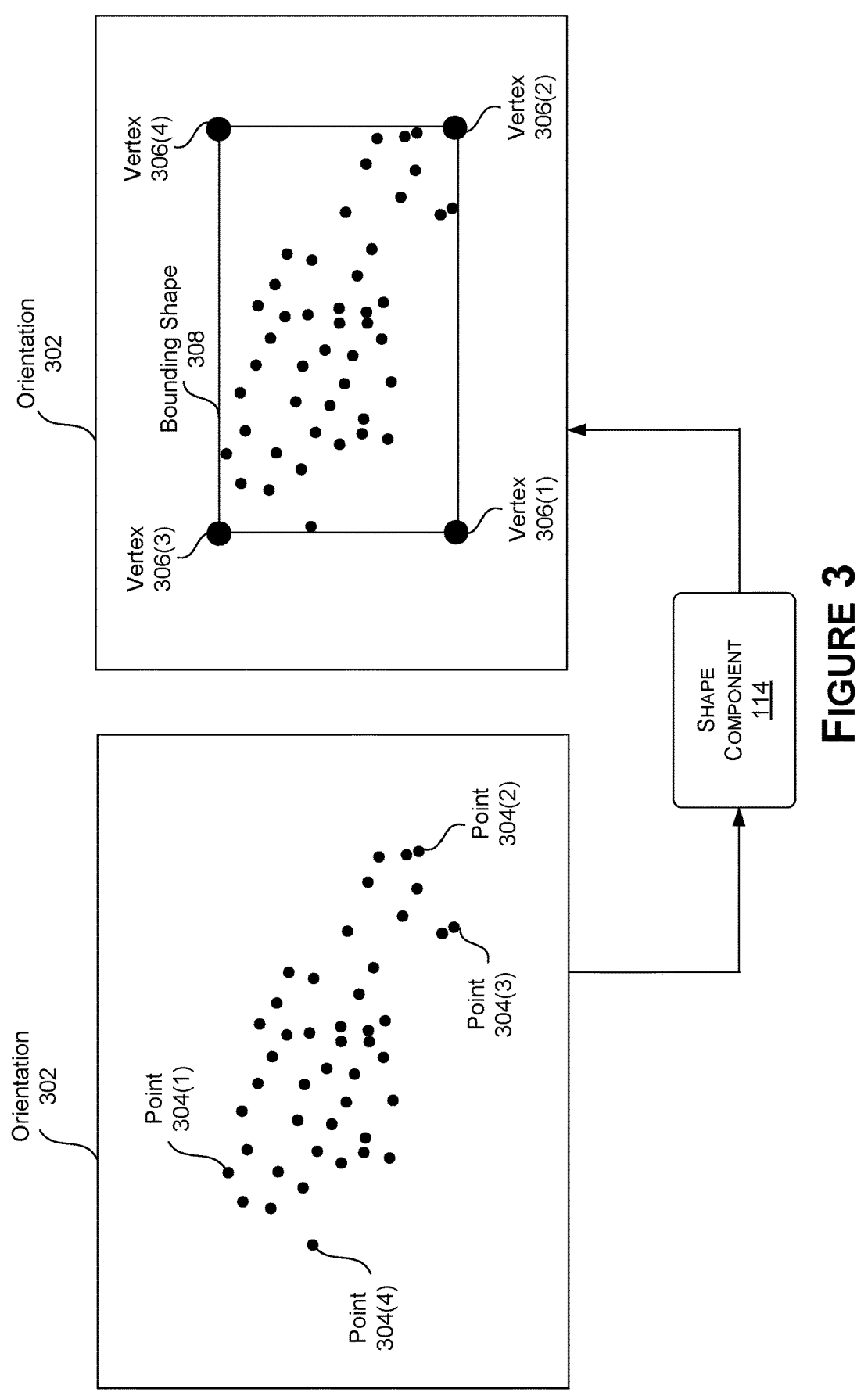
FIG. 3 illustrates an example of determining a first bounding shape associated with a first orientation of a point set, in accordance with some embodiments of the present disclosure.

In the example of FIG. 2, a first set of points may be associated with the first object 204(1) (which is illustrated in the example of FIG. 3) and a second set of point may be associated with the second object 204(2). For instance, the first set of points may include a first portion of the points 206 that are located at a first portion of the image 202 that depicts the first object 204(1) and the second set of points may include a second portion of the points 206 that are located at a second portion of the image 202 that depicts the second object 204(2). Additionally, one or more (e.g., each) point may be associated with a respective location. For example, the location for a point 206 may be represented using at least a first coordinate value (e.g., a x-coordinate value) and a second coordinate value (e.g., a y-coordinate value). In such an example, an origin associated with the coordinate plane may include a corner of the image 202 (e.g., the top-left corner, the top-right corner, the bottom-right corner, or the bottom-left corner) and/or any other location on the image 202.

Referring back to the example of FIG. 1, the process 100 may include a bounding component 110 that is configured to process the point data 108 and, based at least on the processing, determine one or more bounding shapes associated with the set(s) of points represented by the point data 108. As described herein, in some examples, a bounding shape may include a minimum-area bounding rectangle (e.g., a bounding box) that includes (e.g., encompasses, encloses, etc.) one or more points (e.g., each point) from a set of points. However, in other examples, a bounding shape my include any other minimum-area shape that includes (e.g., encompasses, encloses, etc.) one or more points (e.g., each point) from a set of points. For example, the bounding shape may include a triangle, a circle, a square, a pentagon, a hexagon, an octagon, and/or any other shape.

As shown, to determine a bounding shape associated with a set of points, the bounding component 110 may include an orientation component 112 that is configured to determine different orientations associated with the set of points. For instance, and as described herein, the set of points may include points that are associated with initial locations, such as initial locations (e.g., pixel locations) within an image. As such, the orientation component 112 may be configured to determine the different orientations for the points by rotating the points in the set of points by one or more angles. As described herein, an angle of rotation may include, but is not limited to, 25 degrees, 50 degrees, 1 degree, 2 degrees, 5 degrees, and/or any other angle. Additionally, the orientation component 112 may continue to determine the new orientations by rotating the points until reaching a threshold angle. As described herein, the threshold angle may include, but is not limited to, 90 degrees 180 degrees, 270 degrees, 360 degrees, and/or any other angle.

In some examples, the orientation component 112 rotates the points by the same angle to determine the different orientations. For example, if the points include an initial first orientation that is associated with first locations (e.g., initial locations) of the points, the orientation component 112 may rotate the points (e.g., the first locations) by an angle to determine a second orientation for the points, where the points include second locations when in the second orientation. Additionally, the orientation component 112 may rotate the points (e.g., the second locations) by the angle to determine a third orientation for the points, where the points include third locations when in the third orientation. The orientation component 112 may then continue to perform these processes of determining new orientations for the points until rotating the points by the threshold angle.

Additionally, or alternatively, in some examples, the orientation component 112 rotates the points by varying angles to determine the different orientations. For example, if the points include an initial first orientation that is associated with first locations (e.g., initial locations) of the points, the orientation component 112 may rotate the points (e.g., the first locations) by a first angle to determine a second orientation for the points, where the points include second locations when in the second orientation. Additionally, the orientation component 112 may rotate the points (e.g., the first locations or the second locations) by a second, different angle to determine a third orientation for the points, where the points include third locations when in the third orientation. The orientation component 112 may then continue to perform these processes of determining new orientations for the points, where the orientations are associated with angles that are within the threshold angle.

In some examples, the orientation component 112 may use one or more algorithms to rotate the locations of the points. For example, if a location of a point is associated with a x-coordinate value and a y-coordinate value, then the orientation component 112 may rotate the point using the following:

$$x_{rotated} = \cos \theta * x - \sin \theta * y \qquad (1)$$

$$y_{rotated} = \sin \theta * x + \cos \theta * y \qquad (2)$$

In equations (1) and (2), $\theta$ includes the rotation angle, x includes the value of the x-coordinate of the point, y includes the value of the y-coordinate of the point, $x_{rotated}$ incudes the rotated value for the x-coordinate of the point, and $y_{rotated}$ includes the rotated value of the y-coordinate of the point.

The bounding component 110 may further include a shape component 114 that is configured to determine bounding shapes associated with the points in the different orientations. In some examples, to determine a bounding shape associated with an orientation, the shape component 114 may determine minimum and maximum values associated with the locations of the points. For example, the shape component 114 may analyze the locations (e.g., coordinates) associated with the points and determine at least a minimum value (e.g., min(x)) associated with the locations in a first direction, a maximum value (e.g., max(x)) associated with the locations in the first direction, a minimum value (e.g., min(y)) associated with the locations in a second direction, and a maximum value (e.g., max(y)) associated with the locations in the second direction.

The shape component 114 may then determine the vertices associated with the bounding shape using the minimum and maximum values. For instance, the shape component 114 may determine the vertices as the following:

$$\text{Vertex (1)} = [\min(x), \min(y)] \qquad (3)$$

$$\text{Vertex (2)} = [\max(x), \min(y)] \qquad (4)$$

$$\text{Vertex (3)} = [\min(x), \max(y)] \qquad (5)$$

$$\text{Vertex (4)} = [\max(x), \max(y)] \qquad (6)$$

In some examples, such as when the bounding shape is a minimum-area bounding rectangle, Vertex (1) is the bottom-left vertex, Vertex (2) is the bottom-right vertex, Vertex (3) is the top-left vertex, and Vertex (4) is the top-right vertex.

While this example describes determining bounding shapes that include rectangles for the different orientations of the points, in some examples, the shape component 114 may determine different types of bounding shapes for one or more (e.g., each) of the orientations of the points. Additionally, in some examples, the shape component 114 may use one or more additional and/or alternative techniques for determining bounding shapes that include rectangles for the different orientations of the points.

For instance, FIG. 3 illustrates an example of determining a first bounding shape associated with a first orientation of a point set, in accordance with some embodiments of the present disclosure. As shown, the shape component 114 may process data representing a first orientation 302 associated with points 304(1)-(4) (although only four are labeled for clarity reasons) (which may also be referred to singularly as "point 304" or in plural as "points 304"), from the points 206, that are associated with the first object 204(1). To process the data, the shape component 114 may process the first locations associated with the points 304 in order to determine a minimum value (e.g., min(x)) associated with the first locations in a first direction, where the point 304(4) may be associated with the minimum value. Additionally, the shape component 114 may determine a maximum value (e.g., max(x)) associated with the first locations in the first direction, where the point 304(2) may be associated with the maximum value. Furthermore, the shape component 114 may determine a minimum value (e.g., min(y)) associated with the first locations in a second direction, where the point 304(3) may be associated with the minimum value. Moreover, the shape component 114 may determine a maximum value (e.g., max(y)) associated with the first locations in the second direction, where the point 304(1) may be associated with the maximum value.

The shape component 114 may then determine a first vertex 306(1) using the minimum value (e.g., min(x)) in the first direction and the minimum value (e.g., min(y)) in the second direction, a second vertex 306(2) using the maximum value (e.g., max(x)) in the first direction and the minimum value (e.g., min(y)) in the second direction, a third vertex 306(3) using the minimum value (e.g., min(x)) in the first direction and the maximum value (e.g., max(y)) in the second direction, and a fourth vertex 306(4) using the maximum value (e.g., max(x)) in the first direction and the maximum value (e.g., max(y)) in the second direction. The shape component 114 may then determine a first bounding shape 308 using the vertices 306(1)-(4). For instance, and as shown, the shape component 114 may determine the first bounding shape 308 by connecting the vertices 306(1)-(4).

Figure 4A:
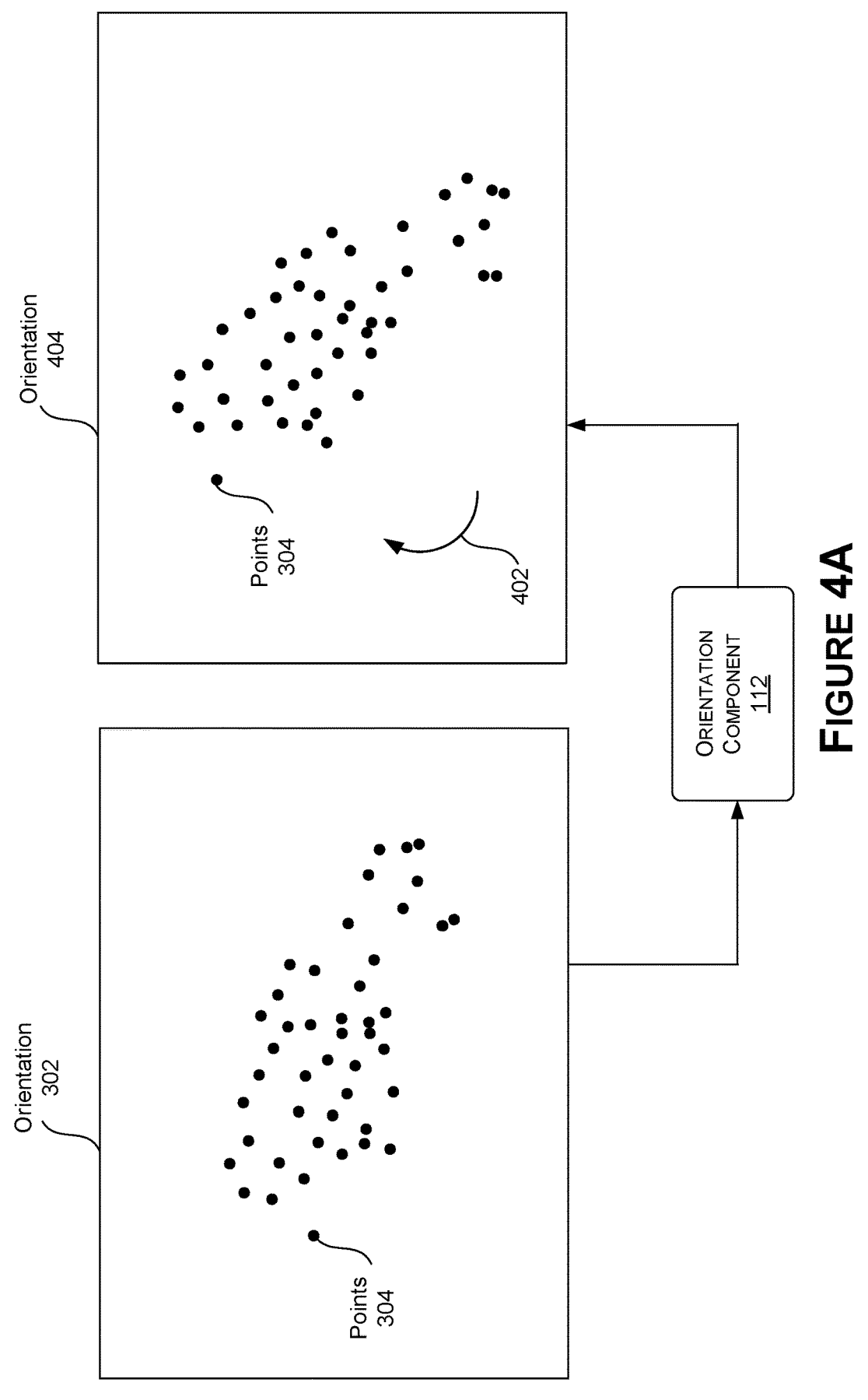
FIGS. 4A-4B illustrate an example of rotating the point set from the example of FIG. 3 to a second orientation and then determining a second bounding shape associated with the point set, in accordance with some embodiments of the present disclosure.
Figure 4B:
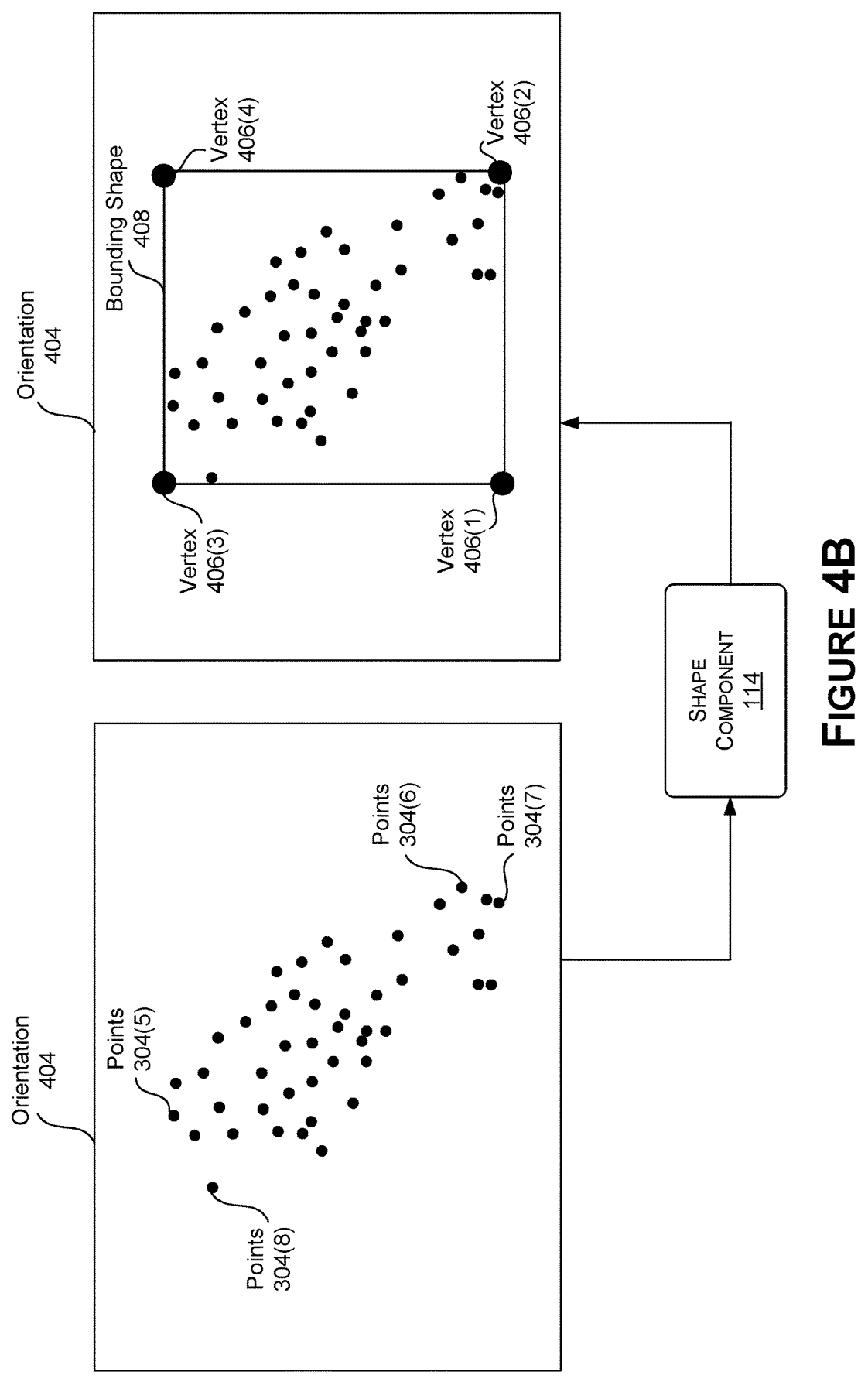

FIGS. 4A-4B illustrate an example of rotating the points 304 to a second orientation and then determining a second bounding shape associated with the second orientation, in accordance with some embodiments of the present disclosure. As shown by the example of FIG. 4A, the orientation component 112 may rotate the points 304 by a given angle (which is represented by 402) in order to generate a second orientation 404 for the points 304. By rotating the points 304 by the given angle, one or more of the first locations (e.g., each location) of the points 304 may be updated to include one or more second locations.

FIG. 4B illustrates an example of determining the second bounding shape associated with the second orientation 404. As shown, the shape component 114 may process data representing the second orientation 404 associated with the points 304. To process the data, the shape component 114 may process the second locations associated with the points 304 in order to determine a minimum value (e.g., min(x)) associated with the second locations in the first direction, where the point 304(8) may be associated with the minimum value. Additionally, the shape component 114 may determine a maximum value (e.g., max(x)) associated with the second locations in the first direction, where the point 304(6) may be associated with the maximum value. Furthermore, the shape component 114 may determine a minimum value (e.g., min(y)) associated with the second locations in the second direction, where the point 304(7) may be associated with the minimum value. Moreover, the shape component 114 may determine a maximum value (e.g., max(y)) associated with the second locations in the second direction, where the point 304(5) may be associated with the maximum value.

The shape component 114 may then determine a first vertex 406(1) using the minimum value (e.g., min(x)) in the first direction and the minimum value (e.g., min(y)) in the second direction, a second vertex 406(2) using the maximum value (e.g., max(x)) in the first direction and the minimum value (e.g., min(y)) in the second direction, a third vertex 406(3) using the minimum value (e.g., min(x)) in the first direction and the maximum value (e.g., max(y)) in the second direction, and a fourth vertex 406(4) using the maximum value (e.g., max(x)) in the first direction and the maximum value (e.g., max(y)) in the second direction. The shape component 114 may then determine a second bounding shape 408 using the vertices 406(1)-(4). For instance, and as shown, the shape component 114 may determine the second bounding shape 408 by connecting the vertices 406(1)-(4).

Figure 5A:
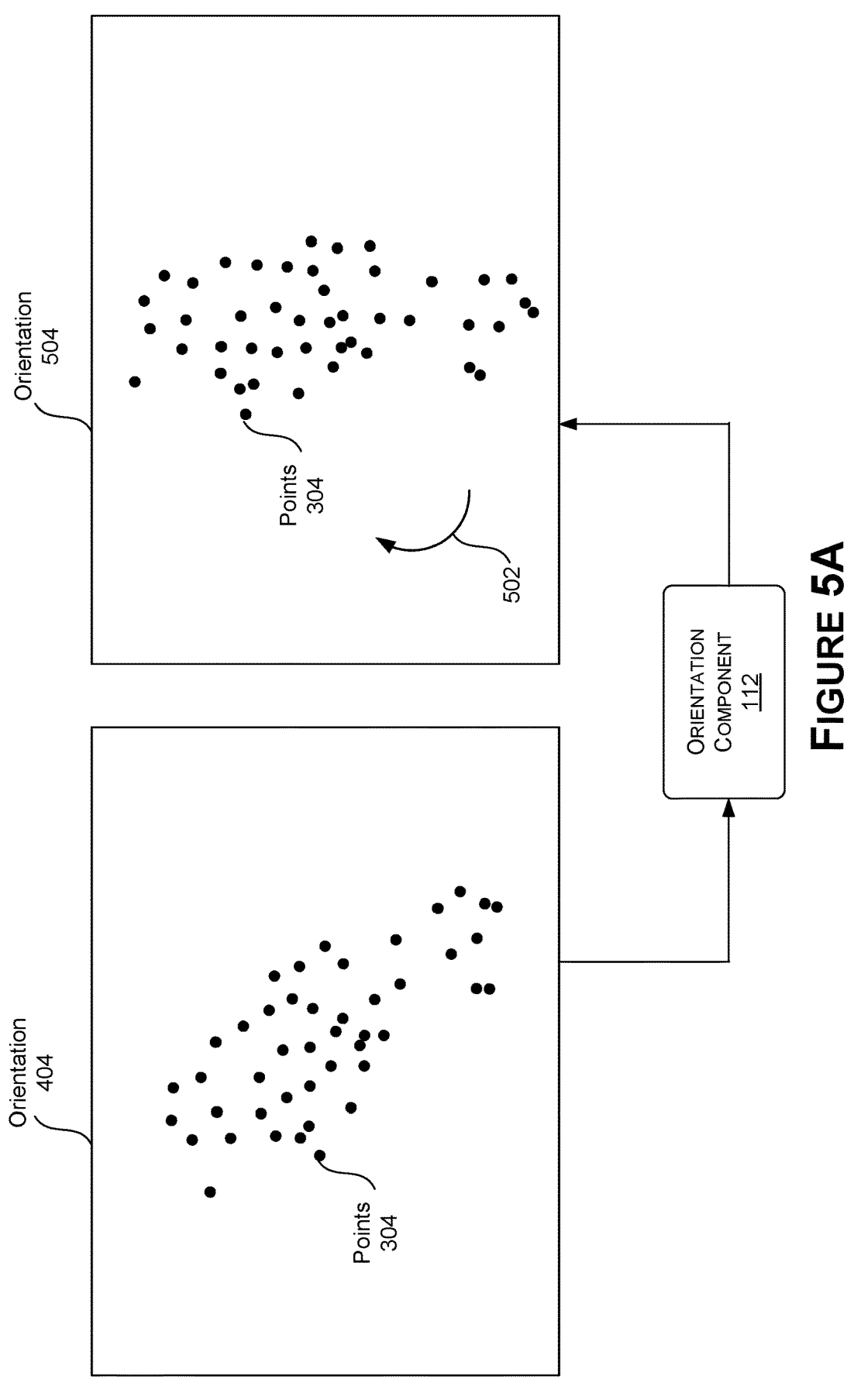
FIGS. 5A-5B illustrate an example of rotating the points set from the example of FIG. 3 to a third orientation and then determining a third bounding shape associated with the point set, in accordance with some embodiments of the present disclosure.
Figure 5B:
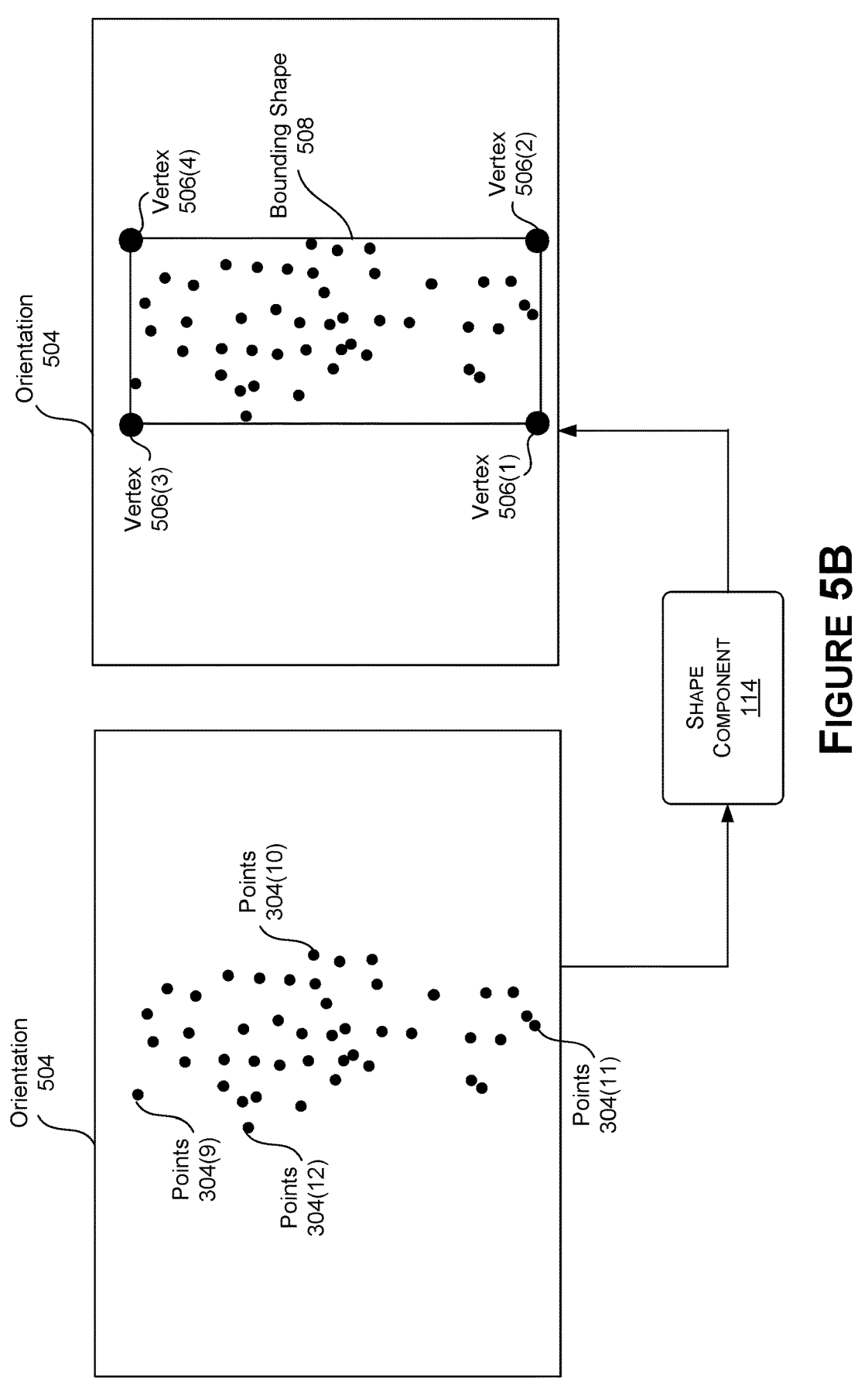

FIGS. 5A-5B illustrate an example of rotating the points 304 to a third orientation and then determining a third bounding shape associated with the third orientation, in accordance with some embodiments of the present disclosure. As shown by the example of FIG. 5A, the orientation component 112 may again rotate the points 304 by a given angle (which is represented by 502) in order to generate a third orientation 504 for the points 304. By rotating the points 304 by the given angle, one or more of the second locations (e.g., each location) of the points 304 may be updated to include one or more third locations.

While the example of FIG. 5A illustrates the orientation component 112 as determining the third orientation 504 for the points 304 by rotating the second orientation 404 for the points 304 by the given angle, in other examples, the orientation component 112 may determine the third orientation 504 by rotating the first orientation 302 by a given angle. In other words, the orientation component 112 may determine the new orientations by rotating the initial orientation by various angles. For example, if the orientation component 112 determines orientations by increments of 1 degree, then the orientation component 112 may determine the second orientation by rotating the locations of the points in the first orientation by 1 degree, determine the third orientation by rotating the locations of the points in the first orientation by 2 degrees, determine a fourth orientation by rotating the locations of the points in the first orientation by 3 degrees, and/or so forth.

FIG. 5B illustrates an example of determining the third bounding shape associated with the third orientation 504. As shown, the shape component 114 may process data representing the third orientation 504 associated with the points 304. To process the data, the shape component 114 may process the third locations associated with the points 304 in order to determine a minimum value (e.g., min(x)) associated with the third locations in the first direction, where the point 304(12) may be associated with the minimum value. Additionally, the shape component 114 may determine a maximum value (e.g., max(x)) associated with the third locations in the first direction, where the point 304(10) may be associated with the maximum value. Furthermore, the shape component 114 may determine a minimum value (e.g., min(y)) associated with the third locations in the second direction, where the point 304(11) may be associated with the minimum value. Moreover, the shape component 114 may determine a maximum value (e.g., max(y)) associated with the third locations in the second direction, where the point 304(9) may be associated with the maximum value.

The shape component 114 may then determine a first vertex 506(1) using the minimum value (e.g., min(x)) in the first direction and the minimum value (e.g., min(y)) in the second direction, a second vertex 506(2) using the maximum value (e.g., max(x)) in the first direction and the minimum value (e.g., min(y)) in the second direction, a third vertex 506(3) using the minimum value (e.g., min(x)) in the first direction and the maximum value (e.g., max(y)) in the second direction, and a fourth vertex 506(4) using the maximum value (e.g., max(x)) in the first direction and the maximum value (e.g., max(y)) in the second direction. The shape component 114 may then determine a third bounding shape 508 using the vertices 506(1)-(4). For instance, and as shown, the shape component 114 may determine the third bounding shape 508 by connecting the vertices 506(1)-(4).

Referring back to the example of FIG. 1, the bounding component 110 may include a selection component 116 that is configured to select one of the bounding shapes for the points. In some examples, to select a bounding shape, the selection component 116 may determine areas associated with the bounding shapes. For instance, if the bounding shapes include minimum-area bounding rectangles, then the selection component 116 may determine the areas by multiplying the lengths by the widths. For example, and for a bounding shape, the selection component 116 may determine an area by determining a first difference between the min(x) and the max(x) and a second difference between the min(y) and the max(y), and then multiplying the first distance by the second distance. The selection component 116 may then select one or more of the bounding shapes based on the areas. In some examples, the selection component 116 may select the bounding shape that includes the smallest area. In such examples, by selecting the bounding shape that is associated with the smallest area, the selection component 116 may select the minimum-area bounding rectangle.

Figure 6:
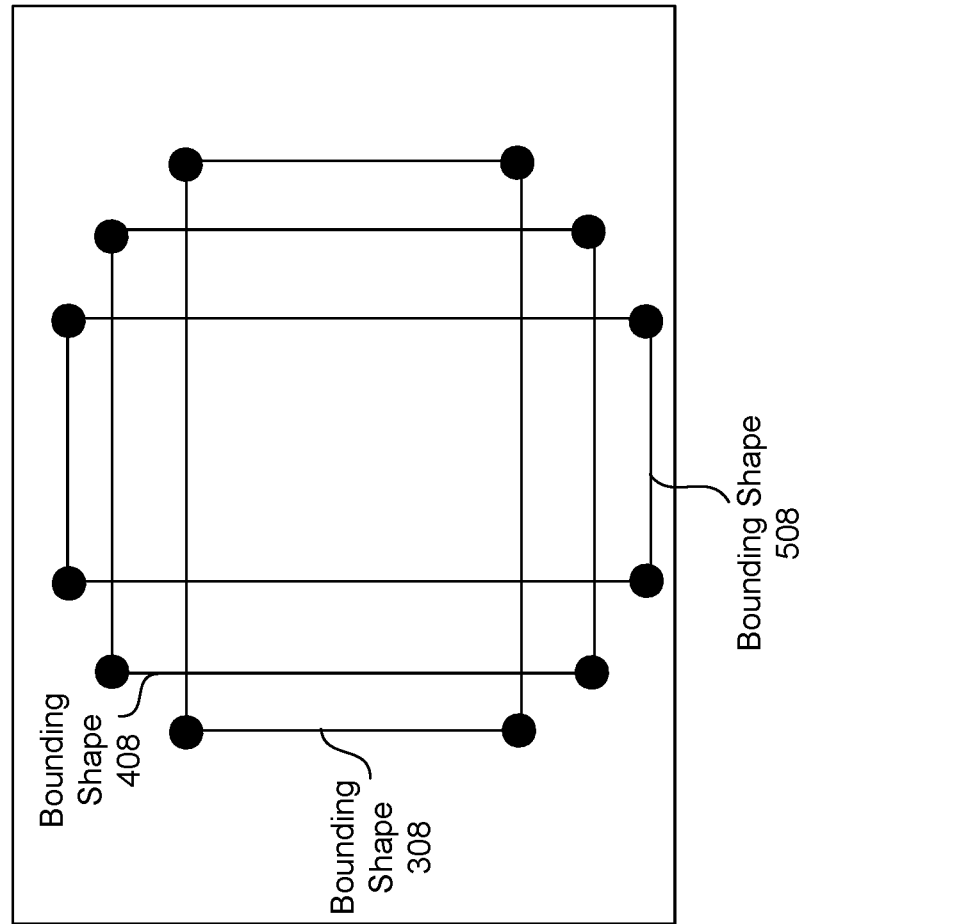
FIG. 6 illustrates an example of selecting a bounding shape associated with a point set, in accordance with some embodiments of the present disclosure.

For instance, FIG. 6 illustrates an example of selecting a bounding shape associated with the points 304, in accordance with some embodiments of the present disclosure. As shown, FIG. 6 illustrates the bounding shapes 308, 408, and 508 determined for the orientations 302, 404, and 504 of the points 304. While the example of FIG. 6 illustrates using three bounding shapes 308, 408, and 508 associated with three different orientations 302, 404, and 504 for the points 304, in other examples, the bounding component 110 may determine any number of bounding shapes associated with any number of orientations for the points 304. For example, if the threshold angle is 90 degrees and the rotation angle is 1 degree, then the bounding component 110 may determine ninety-one bounding shapes associated with ninety-one different orientations for the points 304.

In the example of FIG. 6, the selection component 116 may determine a first area associated with the first bounding shape 308, a second area associated with the second bounding shape 408, and a third area associated with the third bounding shape 508. The selection component 116 may then select at least one of the bounding shapes 308, 408, and/or 508 using the areas. For example, the selection component 116 may select the bounding shape(s) 308, 408, and/or 508 that is associated with the smallest area. As such, in the example of FIG. 6, the selection component 116 may select the third bounding shape 508 based on the third bounding shape 508 including the smallest area.

Referring back to the example of FIG. 1, the bounding component 110 may include a rotation component 118 that is configured to rotate the selected bounding shape in order to determine a final bounding shape for the points. In some examples, the rotation component 118 may determine an angle for rotating the selected bounding shape, where the angle is based on the rotation of the orientation associated with the points for which the selected bounding shape was generated. For a first example, if the points were rotated clockwise 45 degrees to create an orientation for which the selected bounding shape was generated, then the rotation component 118 may determine the final bounding shape by rotating the selected bounding shape counterclockwise by 45 degrees. For a second example, if the points were rotated clockwise by 60 degrees to create an orientation for which the selected bounding shape was generated, then the rotation component 118 may determine the final bounding shape by rotating the selected bounding shape counterclockwise by 60 degrees.

Figure 7:
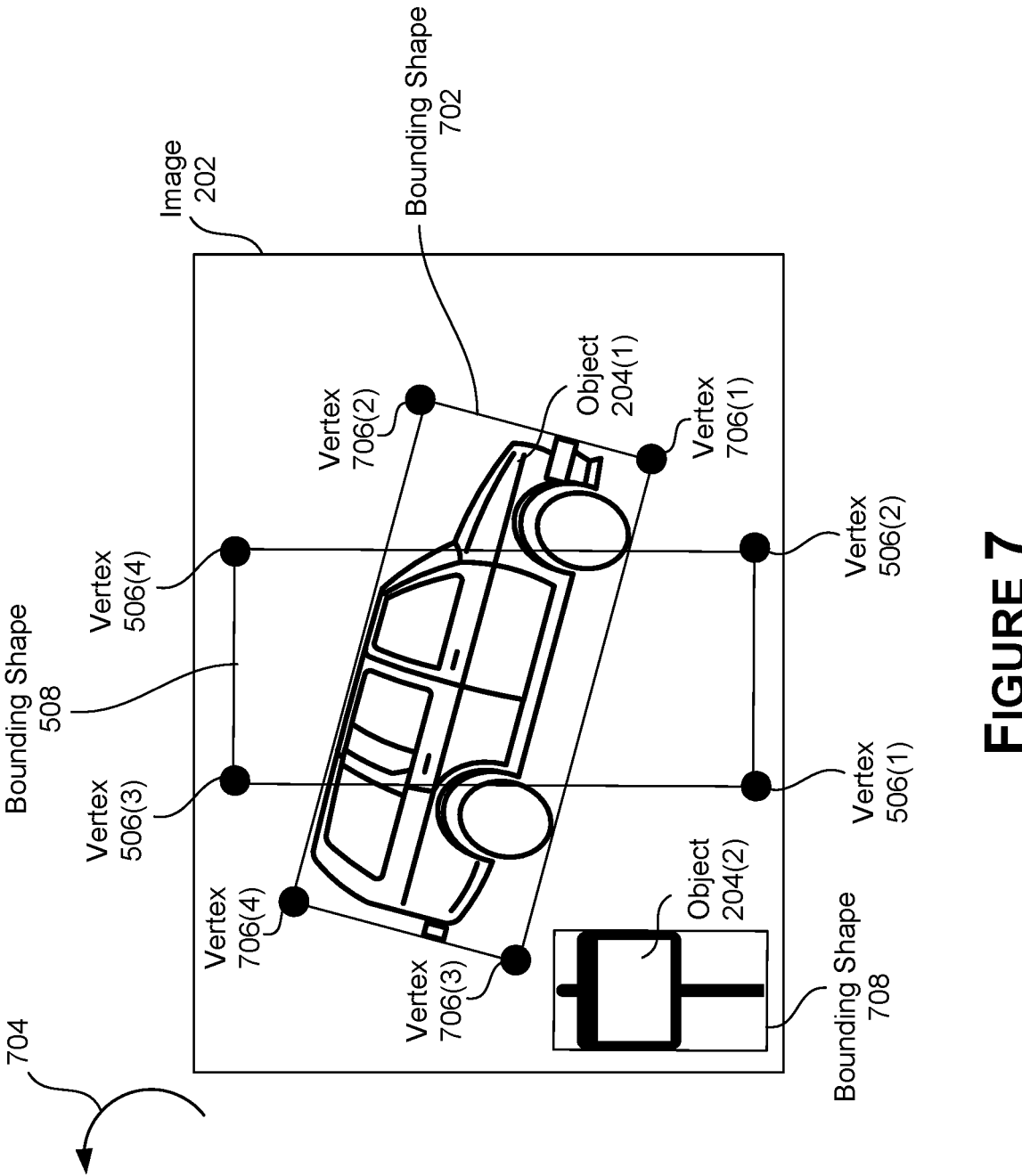
FIG. 7 illustrates an example of determining a final bounding shape associated with a point set and/or an object, in accordance with some embodiments of the present disclosure.

For instance, FIG. 7 illustrates an example of determining a final bounding shape associated with a point set and/or an object, in accordance with some embodiments of the present disclosure. In the example of FIG. 7, the rotation component 118 may determine a total angle that the orientation component 112 used to determine the third orientation 504 associated with the points 304. The rotation component 118 may then use the total angle and the bounding shape 508 to determine a final bounding shape 702 associated with the first object 204(1). For example, the rotation component 118 may determine final bounding shape 702 by rotating the bounding shape 508 counterclockwise by the total angle, which is represented by 704. In some examples, the rotation component 118 rotates the bounding shape 508 by rotating each of the vertices 506(1)-(4) counterclockwise by the total angle to respectively determine vertices 706(1)-(4) of the final bounding shape 702 (e.g., using the equations (1) and (2)). The rotation component 118 may then generate the final bounding shape 702 by connecting the vertices 706(1)-(4).

As further illustrated in the example of FIG. 7, the bounding component 110 may have performed similar processes to determine a final bounding shape 708 associated with the second object 204(2). In some examples, the bounding component 110 may perform the processing associated with determining the final bounding shape 702 at least partially in parallel with performing the processing associated with determining the final bounding shape 708. In other words, the bounding component 110 may determine final bounding shapes associated with any number of objects represented by any number of instances of sensor data in parallel in order to reduce the overall latency.

Referring back to the example of FIG. 1, the bounding component 110 may output data 120 representing at least location information for the final bounding shape(s) associated with the point set(s) and/or the object(s) associated with the point set(s). For instance, in some examples, and for a final bounding shape, the output data 120 may indicate locations of the vertices of the final bounding shape. In some examples, the output data 120 may indicate a location of the center of the final bounding shape along with a size (e.g., a length, width, etc.) associated with the final bounding shape. Still, in some examples, the output data 120 may indicate a location of one of the vertices of the final bounding shape along with the size of the final bounding shape. While these are just a couple examples of location information that may be output for the final bounding shape, in other examples, the bounding component 110 may output any other type of data 120 associated with the final bounding shape.

The process 100 may include a processing component 122 (e.g., a system(s)) performing additional processing based at least on the location(s) of the final bounding shape(s). For a first example, if a final bounding shape indicates the location of an object within an image, the processing component 122 may then process the portion of the image associated with the final bounding shape in order to determine information (e.g., a class type) associated with the object. For a second example, if a final bounding shape indicates the location of text within an image, then the processing component 122 may process the portion of the image associated with the bounding shape to identify the text. Still, for a third example, the processing component 122 may generate a cropped image using the final bounding shape (e.g., an image that mostly depicts the object, text, points, etc.). While these are just a couple examples of processing that may be performed using the final bounding shape, in other examples, the processing component 122 may perform additional and/or alternative processing using the final bounding shape.

In some examples, one or more of the sensor(s) 104, the processing component 106, the bounding component 110, the orientation component 112, the shape component 114, the selection component 116, the rotation component 118, or the processing component 122 may be included within a system(s), machine, device, and/or the like, such as the computing device(s) 1000 and/or the data center 1100. Additionally, one or more of the processing component 106, the bounding component 110, the orientation component 112, the shape component 114, the selection component 116, the rotation component 118, or the processing component 122 may perform one or more of the processes described herein using a machine learning model(s), a neural network(s), an algorithm(s), and/or so forth.

Figure 9:
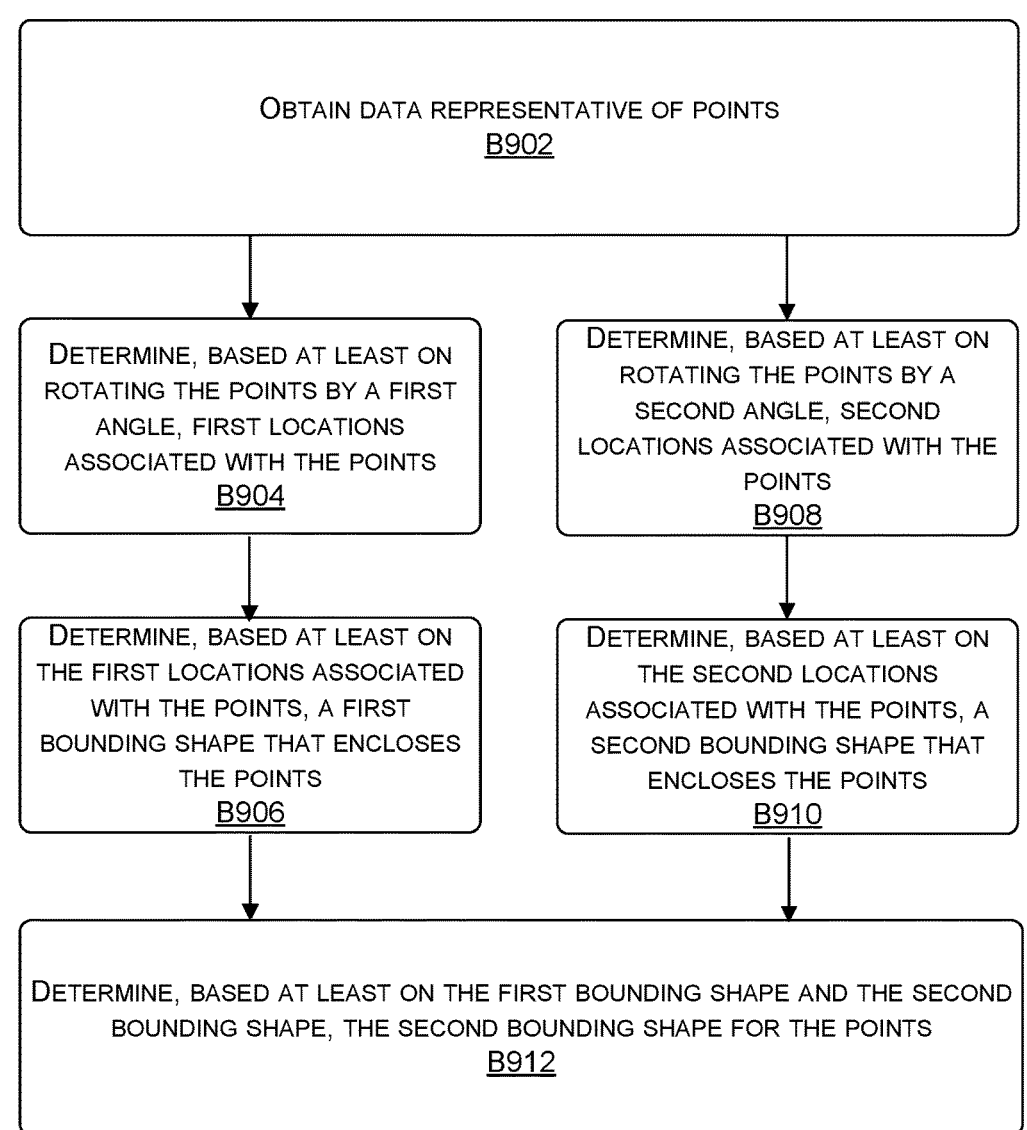
FIG. 9 is a flow diagram showing a method for performing parallel processing to determine a bounding shape associated with a point set and/or an object, in accordance with some embodiments of the present disclosure.

Now referring to FIGS. 8 and 9, each block of methods 800 and 900, described herein, comprises a computing process that may be performed using any combination of hardware, firmware, and/or software. For instance, various functions may be carried out by a processor executing instructions stored in memory. The methods 800 and 900 may also be embodied as computer-usable instructions stored on computer storage media. The methods 800 and 900 may be provided by a standalone application, a service or hosted service (standalone or in combination with another hosted service), or a plug-in to another product, to name a few. In addition, the methods 800 and 900 are described, by way of example, with respect to FIG. 1. However, the methods 800 and 900 may additionally or alternatively be executed by any one system, or any combination of systems, including, but not limited to, those described herein.

FIG. 8 is a flow diagram showing a method 800 for determining a bounding shape associated with a point set and/or an object, in accordance with some embodiments of the present disclosure. The method 800, at block B802, may include determining, based at least on first locations associated with points, a first bounding shape that encloses the points. For instance, the bounding component 110 (e.g., the shape component 114) may determine the first bounding shape associated with the points (and/or an object) using the first locations (e.g., a first orientation associated with the points). In some examples, the bounding component 110 determines the first bounding shape by determining minimum and maximum values associated with the first locations. The bounding component 110 then uses the minimum and maximum values to determine the vertices for the first bounding shape.

The method 800, at block B804, may include determining, based at least on rotating the points, second locations associated with the points. For instance, the bounding component 110 (e.g., the orientation component 112) may determine the second locations associated with the points (e.g., a second orientation associated with the points) by rotating the points by an angle. As described herein, the angle my include, but is not limited to, 25 degrees, 50 degrees, 1 degree, 2 degrees, 5 degrees, and/or any other angle. In some examples, the bounding component 110 may continue to determine various locations (e.g., orientations) associated with the points by rotating the points using one or more angles. For example, the bounding component 110 may continue to rotate the points until satisfying a threshold angle. As described herein, the threshold angle may include, but is not limited to, 90 degrees 180 degrees, 270 degrees, 360 degrees, and/or any other angle.

The method 800, at block B806, may include determining, based at least on the second locations associated with the points, a second bounding shape that encloses the points. For instance, the bounding component 110 (e.g., the shape component 114) may determine the second bounding shape associated with the points using the second locations. In some examples, the bounding component 110 determines the second bounding shape by determining minimum and maximum values associated with the second locations. The bounding component 110 then uses the minimum and maximum values to determine the vertices for the second bounding shape.

The method 800, at block B808, may include determining, based at least on the first bounding shape and the second bounding shape, the second bounding shape for the points. For instance, the bounding component 110 (e.g., the selection component 116) may determine a first area associated with the first bounding shape and a second area associated with the second bounding shape (and/or additional areas associated with additional bounding shapes). The bounding component 110 may then select the second bounding shape based at least on the second bounding shape including the smallest area. Additionally, the bounding component 110 (e.g., the rotation component 118) may determine a final bounding shape associated with the points by rotating the second bounding shape. In some examples, the bounding component 110 rotates the second bounding shape based at least on the angle used to rotate the points to determine the second locations associated with the points.

FIG. 9 is a flow diagram showing a method 900 for performing parallel processing to determine a bounding shape associated with a point set and/or an object, in accordance with some embodiments of the present disclosure. The method 900, at block B902, may include obtaining data representative of points. For instance, the bounding component 110 may obtain the point data 108 representative of the points (and/or an object). As described herein, the point data 108 may represent information, such as location information, associated with the points. For a first example, the location information for a respective point may indicate a 2D location, such as a x-coordinate and a y-coordinate of the point. For a second example, the location information for a respective point may indicate a 3D location, such as a x-coordinate, a y-coordinate, and a z-coordinate of the point.

The method 900, at block B904, may include determining, based at least on rotating the points by a first angle, first locations associated with the points and the method 900, at block B906, may include determining, based at least on the first locations associated with the points, a first bounding shape that encloses the points. For instance, the bounding component 110 (e.g., the orientation component 112) may determine the first locations associated with the points (e.g., a first orientation associated with the points) by rotating the points by the first angle. The bounding component 110 (e.g., the shape component 114) may then determine the first bounding shape using the first locations of the points. In some examples, the bounding component 110 determines the first bounding shape by determining minimum and maximum values associated with the first locations. The bounding component 110 then uses the minimum and maximum values to determine the vertices for the first bounding shape.

At least partially during the processes associated with the block B904 and/or the block B906, the method 900, at block B908, may include determining, based at least on rotating the points by a second angle, second locations associated with the points and the method 900, at block B910, may include determining, based at least on the second locations associated with the points, a second bounding shape that encloses the points. For instance, the bounding component 110 (e.g., the orientation component 112) may determine the second locations associated with the points (e.g., a second orientation associated with the points) by rotating the points by the second angle. The bounding component 110 (e.g., the shape component 114) may then determine the second bounding shape using the second locations of the points. In some examples, the bounding component 110 determines the second bounding shape by determining minimum and maximum values associated with the second locations. The bounding component 110 then uses the minimum and maximum values to determine the vertices for the second bounding shape.

In some examples, the bounding component 110 may continue to perform similar processes to determine, at least partially in parallel, additional locations associated with the points and/or additional bounding shapes associated with the additional locations.

The method 900, at block B912, may include determining, based at least on the first bounding shape and the second bounding shape, the second bounding shape for the points. For instance, the bounding component 110 (e.g., the selection component 116) may determine a first area associated with the first bounding shape and a second area associated with the second bounding shape (and/or additional areas associated with additional bounding shapes). The bounding component 110 may then select the second bounding shape based at least on the second bounding shape including the smallest area. Additionally, the bounding component 110 (e.g., the rotation component 118) may determine a final bounding shape associated with the points by rotating the second bounding shape. In some examples, the bounding component 110 rotates the second bounding shape based at least on the second angle used to rotate the points to determine the second locations associated with the points.

Example Computing Device

Figure 10:
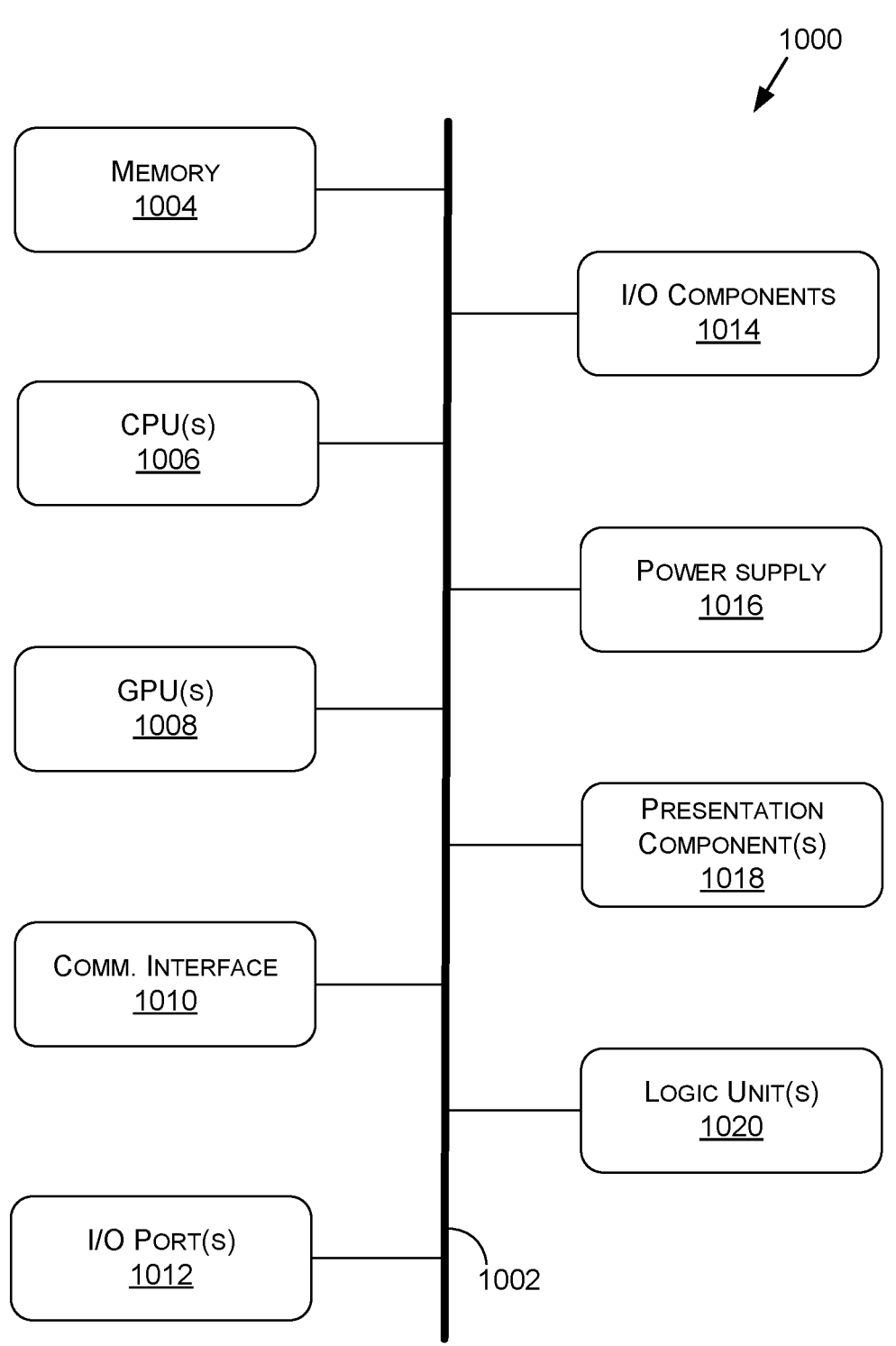
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
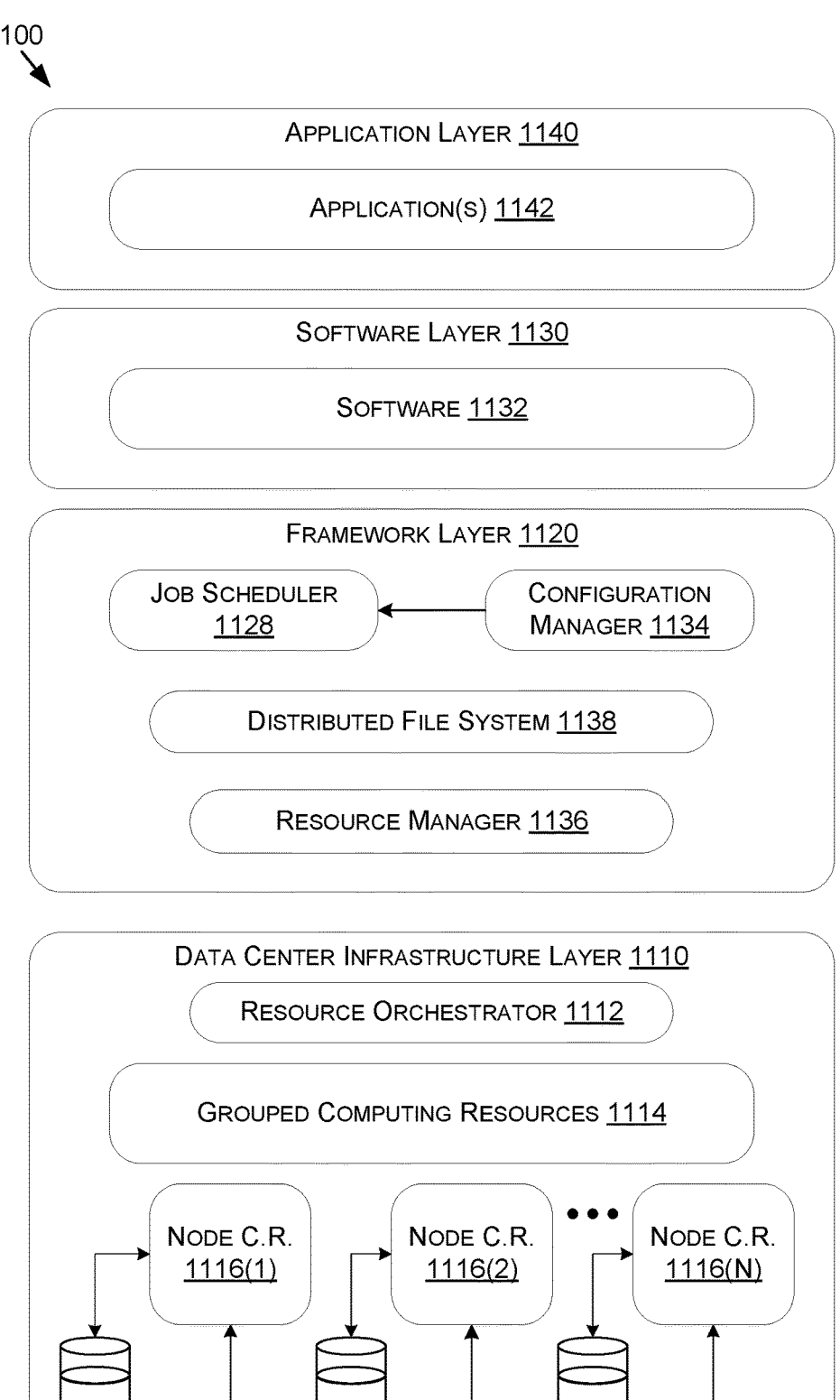
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, based at least on first locations associated with points corresponding to an object depicted by an image, a first bounding shape that encloses the points;
   determining, based at least on rotating one or more of the points by an angle and in a first direction, second locations associated with the points;
   determining, based at least on the second locations associated with the points, a second bounding shape that encloses the points at the second locations;
   selecting, based at least on the first bounding shape and the second bounding shape, the second bounding shape for the points;
   determining, based at least on rotating the second bounding shape by the angle in a second direction that is different than the first direction, a final bounding shape for the points; and
   processing, using one or more machine learning models, a portion of the image that includes the final bounding shape to determine information associated with the object that corresponds to the points.

2. The method of claim 1, wherein the selecting the second bounding shape for the points comprises:
   determining a first area of the first bounding shape and a second area of the second bounding shape;
   determining that the second area is less than the first area; and
   selecting, based at least on the second area being less than the first area, the second bounding shape for the points.

3. The method of claim 1, wherein the determining the second bounding shape that encloses the points comprises:
   determining, based at least on the second locations, a first minimum value and a first maximum value associated with a first direction and a second minimum value and a second maximum value associated with a second direction;
   determining vertices based at least on the first minimum value, the first maximum value, the second minimum value, and the second maximum value; and
   determining the second bounding shape using the vertices.

4. The method of claim 3, wherein the determining the vertices comprises:

determining a first vertex based at least on the first minimum value and the second minimum value;

determining a second vertex based at least on the first minimum value and the second maximum value;

determining a third vertex based at least on the first maximum value and the second minimum value; and determining a fourth vertex based at least on the first maximum value and the second maximum value.

5. The method of claim 1, further comprising:

determining, based at least on rotating the points by a second angle, third locations associated with the points; and determining, based at least on the third locations associated with the points, a third bounding shape that encloses the points, wherein the selecting the second bounding shape for the points is further based at least on the third bounding shape.

6. The method of claim 1, wherein:

the determining the first bounding shape that encloses the points occurs during a period of time; and at least one of the determining the second locations associated with the points or the determining the second bounding shape that encloses the points occurs at least partially during the period of time.

7. The method of claim 1, wherein the determining the first bounding shape that encloses the points, the determining the second locations associated with the points, the determining the second bounding shape that encloses the points, and the selecting the second bounding shape for the points occur during a period of time, and wherein, during at least a portion of the period of time, the method further comprises:

determining, based at least on third locations associated with second points, a third bounding shape that encloses the second points;

determining, based at least on rotating the second points, fourth locations associated with the second points;

determining, based at least on the fourth locations associated with the second points, a fourth bounding shape that encloses the second points; and selecting, based at least the third bounding shape and the fourth bounding shape, the fourth bounding shape for the second points.

8. A system comprising:

one or more processors to:

determine, based at least on a first orientation associated with an object depicted in an image, a first bounding shape that encloses the object, the first bounding shape being defined using first coordinate locations associated with a coordinate system;

determine, based at least on rotating the object, a second orientation associated with the object;

determine, based at least on the second orientation associated with the object, a second bounding shape that encloses the object, the second bounding shape being defined using second coordinate locations associated with the coordinate system; and selecting, based at least on the first bounding shape and the second bounding shape, the second bounding shape for the object.

9. The system of claim 8, wherein the selection of the second bounding shape for the object comprises:

determining a first area of the first bounding shape and a second area of the second bounding shape;

determining that the second area is less than the first area; and selecting, based at least on the second area being less than the first area, the second bounding shape for the object.

10. The system of claim 8, wherein the rotating the object comprises rotating the object according to an angle and in a first direction, and wherein the one or more processors are further to determine, based at least on rotating the second bounding shape according to the angle and in a second direction, a final bounding shape for the object.

11. The system of claim 8, wherein the first bounding shape that encloses the object is determined by:

determining, based at least on the first orientation associated with the object, a first minimum value and a first maximum value associated with a first direction and a second minimum value and a second maximum value associated with a second direction;

determining vertices based at least on the first minimum value, the first maximum value, the second minimum value, and the second maximum value; and determining the first bounding shape using the vertices.

12. The system of claim 11, wherein determining the vertices comprises:

determining a first vertex based at least on the first minimum value and the second minimum value;

determining a second vertex based at least on the first minimum value and the second maximum value;

determining a third vertex based at least on the first maximum value and the second minimum value; and determining a fourth vertex based at least on the first maximum value and the second maximum value.

13. The system of claim 11, wherein the second bounding shape that encloses the object is determined by:

determining, based at least on the second orientation associated with the object, a third minimum value and a third maximum value associated with the first direction and a fourth minimum value and a fourth maximum value associated with the second direction;

determining second vertices based at least on the third minimum value, the third maximum value, the fourth minimum value, and the fourth maximum value; and determining the second bounding shape using the second vertices.

14. The system of claim 8, wherein the rotating of the object comprises rotating the object according to a first angle, and wherein the one or more processors are further to:

determine, based at least on rotating the object according to a second angle, a third orientation associated with the object; and determine, based at least on the third orientation associated with the object, a third bounding shape that encloses the object, wherein the second bounding shape for the object is further selected based at least on the third bounding shape.

15. The system of claim 8, wherein:

the first bounding shape that encloses the object is determined during a period of time; and at least one of the determination of the second orientation associated with the object or the determination of the second bounding shape that encloses the object occurs at least partially during the period of time.

16. The system of claim 8, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for performing operations using a language model;

a system for generating synthetic data;

a system incorporating one or more virtual machines (VMs);

a system implemented at least partially in a data center; or a system implemented at least partially using cloud computing resources.

17. One or more processors comprising processing circuitry to:

determine, based at least on first locations associated with points within a coordinate system, a first bounding shape that encloses the points;

determine, based at least on rotating one or more of the points, second locations associated with the points within the coordinate system that differ from the first locations associated with the points;

determine, based at least on the second locations associated with the points within the coordinate system, a second bounding shape that encloses the points; and select, based at least on the first bounding shape and the second bounding shape, the second bounding shape for the points.

18. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for performing operations using a language model;

a system for generating synthetic data;

a system incorporating one or more virtual machines (VMs);

a system implemented at least partially in a data center; or a system implemented at least partially using cloud computing resources.

19. The method of claim 1, wherein:

the first bounding shape is defined using first coordinate locations associated with a coordinate system; and the second bounding shape is defined using second coordinate locations associated with the coordinate system.

20. The method of claim 1, wherein the first bounding shape includes a same orientation associated with a coordinate system as the second bounding shape.

* * * * *